United States Patent
Nakamura et al.

(10) Patent No.: US 12,182,753 B2
(45) Date of Patent: Dec. 31, 2024

(54) MANAGEMENT METHOD AND MANAGEMENT APPARATUS

(71) Applicant: TOYOTA JIDOSHA KABUSHIKI KAISHA, Toyota (JP)

(72) Inventors: Motohiro Nakamura, Okazaki (JP); Toshiki Kashiwakura, Tokyo-to (JP); Yosuke Togami, Nagoya (JP); Yusuke Kobayashi, Tokyo-to (JP); Seii Sai, Yokohama (JP); Tsuyoshi Okada, Nagoya (JP); Naoko Yokoyama, Tokyo-to (JP); Keishi Kinoshita, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/492,780

(22) Filed: Oct. 24, 2023

(65) Prior Publication Data
US 2024/0144156 A1    May 2, 2024

(30) Foreign Application Priority Data
Nov. 1, 2022    (JP) .................. 2022-175737

(51) Int. Cl.
*G06Q 10/083* (2024.01)
*G06Q 50/40* (2024.01)

(52) U.S. Cl.
CPC ......... *G06Q 10/083* (2013.01); *G06Q 50/40* (2024.01)

(58) Field of Classification Search
CPC .............................. G06Q 10/083; G06Q 50/40
USPC ........................................................ 705/330
See application file for complete search history.

(56) References Cited

U.S. PATENT DOCUMENTS

| | | | |
|---|---|---|---|
| 2015/0227888 A1* | 8/2015 | Levanon ............ | G06Q 10/0834 705/334 |
| 2017/0262790 A1* | 9/2017 | Khasis ............... | G01C 21/3415 |
| 2018/0349872 A1* | 12/2018 | Ahmed ............... | G07G 1/0036 |

FOREIGN PATENT DOCUMENTS

JP    2019139644 A    8/2019

OTHER PUBLICATIONS

"Impact of drone delivery on sustainability and cost: Realizing the UAV potential through vehicle routing optimization" Published by Elsevier (Year: 2019).*

* cited by examiner

*Primary Examiner* — Zeina Elchanti
(74) *Attorney, Agent, or Firm* — KENJA IP LAW PC

(57) ABSTRACT

A management method includes determining, by a management apparatus, a stopping location for a vehicle used for delivery, based on vehicle classification data on the vehicle, delivery environment information, and stopping environment information during the delivery.

7 Claims, 2 Drawing Sheets

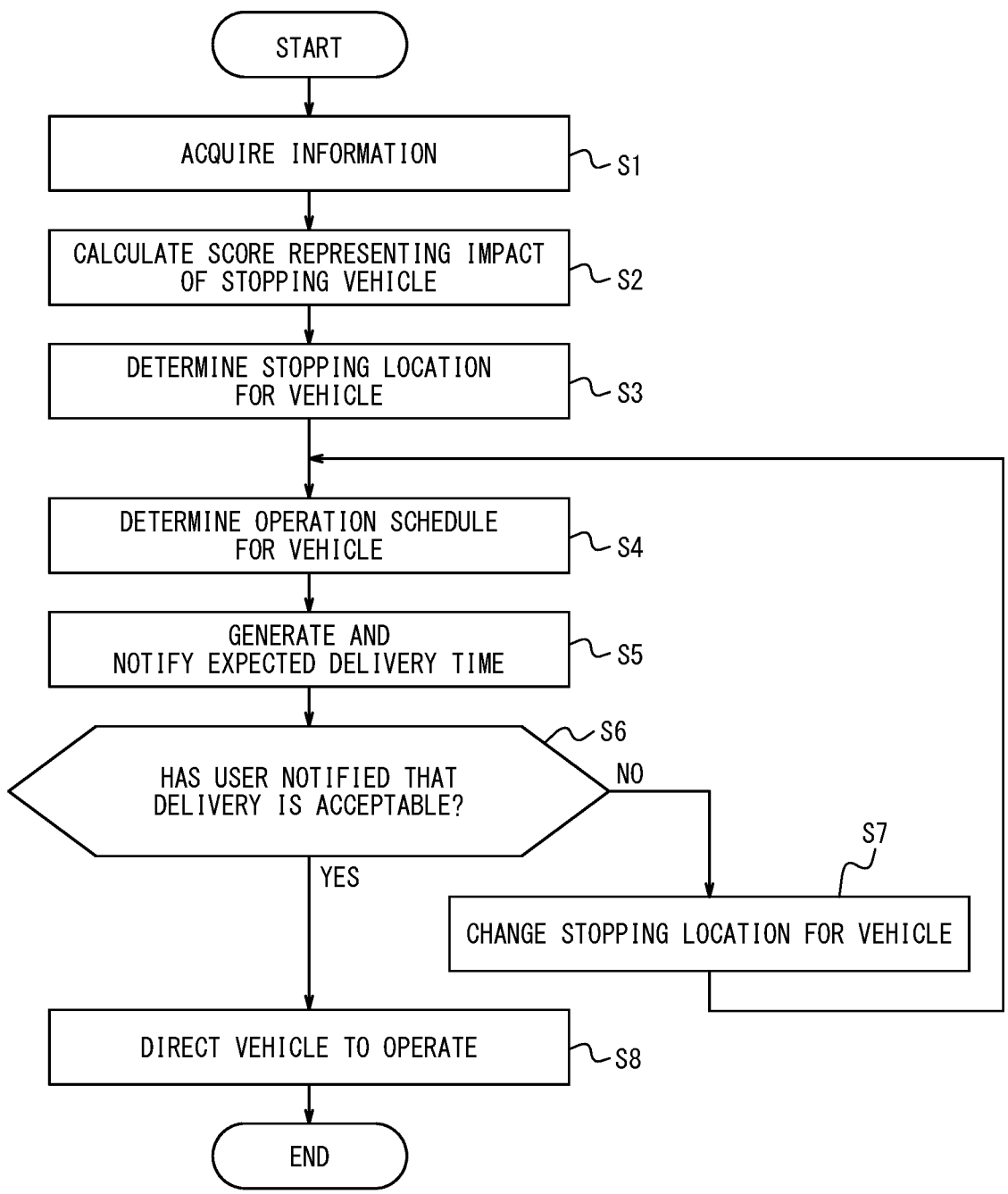

MANAGEMENT METHOD AND MANAGEMENT APPARATUS

CROSS-REFERENCE TO RELATED APPLICATION

This application claims priority to Japanese Patent Application No. 2022-175737, filed on Nov. 1, 2022, the entire contents of which are incorporated herein by reference.

TECHNICAL FIELD

The present disclosure relates to a management method and a management apparatus.

BACKGROUND

Apparatuses that provide route information according to vehicle classification are known (see, for example, Patent Literature (PTL) 1).

CITATION LIST

Patent Literature

PTL 1: JP 2019-139644 A

SUMMARY

The overall efficiency of delivery work by vehicle is required to be improved.

It would be helpful to improve the overall efficiency of delivery work.

A management method according to an embodiment of the present disclosure includes determining, by a management apparatus, a stopping location for a vehicle used for delivery, based on vehicle classification data on the vehicle, delivery environment information, and stopping environment information during the delivery.

A management apparatus according to an embodiment of the present disclosure includes a controller configured to determine a stopping location for a vehicle used for delivery, based on vehicle classification data on the vehicle, delivery environment information, and stopping environment information during the delivery.

According to a management method and a management apparatus of an embodiment of the present disclosure, the overall efficiency of delivery work by vehicle can be improved.

BRIEF DESCRIPTION OF THE DRAWINGS

In the accompanying drawings:

FIG. 2 is a flowchart illustrating an example procedure of a management method according to an embodiment.

Figure 1:
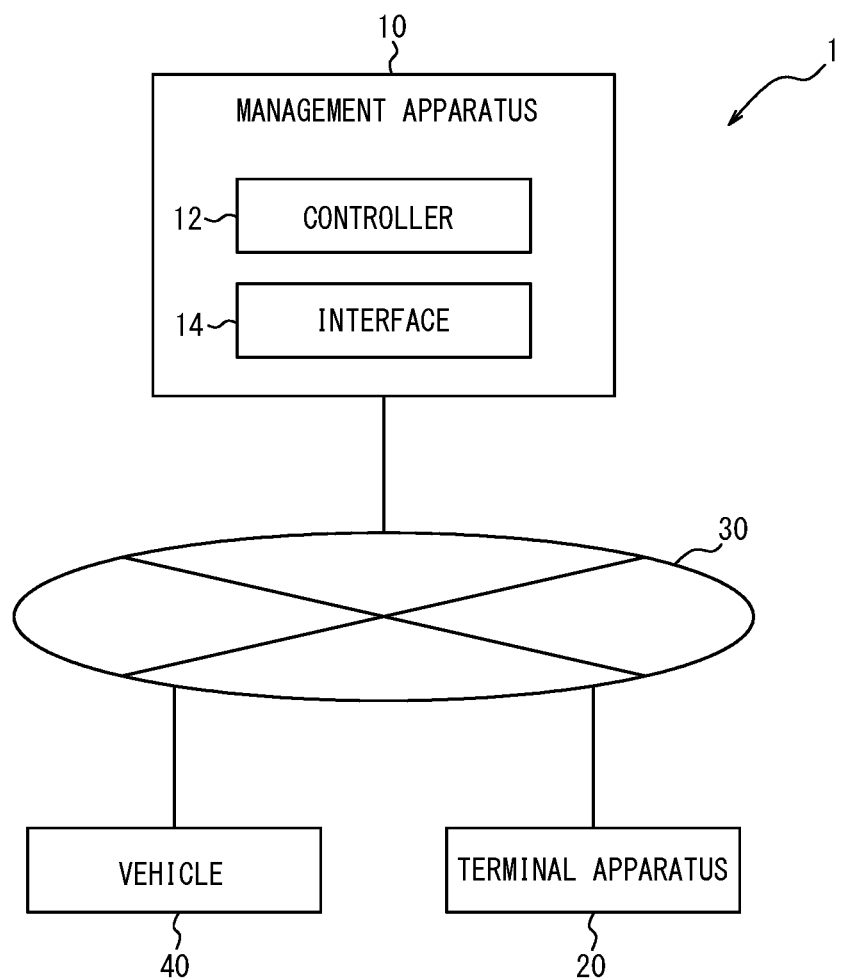
FIG. 1 is a block diagram illustrating an example configuration of a management system according to an embodiment.

DETAILED DESCRIPTION (Example Configuration of Management System 1)

As illustrated in FIG. 1, a management system 1 according to an embodiment includes a management apparatus 10 and a vehicle 40. The vehicle 40 carries packages to be delivered. The management apparatus 10 manages operations of the vehicle 40 so as to increase the efficiency of delivery of the packages. The management apparatus 10 determines a stopping location for the vehicle 40 at a delivery destination of a package, in order to increase the efficiency of delivery of the packages.

The management system 1 further includes, but is not required to include, a terminal apparatus 20. The terminal apparatus 20 may be mounted in the vehicle 40 or may be carried by a driver of the vehicle 40. The terminal apparatus 20 may be configured to output the stopping location determined by the management apparatus 10 and notify the driver of the stopping location. The terminal apparatus 20 may be carried by a user who receives a package. An example configuration of the management system 1 will be described below.

<Management Apparatus 10>

The management apparatus 10 includes a controller 12 and an interface 14.

The controller 12 controls at least one component of the management apparatus 10. The controller 12 may be configured to include at least one processor. The "processor" may include a general purpose processor, a dedicated processor specialized for specific processing, or the like in the present embodiment, but not limited to these. The controller 12 may be configured to include at least one dedicated circuit. The dedicated circuit may include, for example, a field-programmable gate array (FPGA) or an application specific integrated circuit (ASIC). The controller 12 may be configured with the dedicated circuit instead of the processor, or may be configured with the dedicated circuit along with the processor.

The management apparatus 10 may further include a memory. The memory is a semiconductor memory, a magnetic memory, an optical memory, or the like, for example, but not limited to these. The memory may function, for example, as a main memory, an auxiliary memory, or a cache memory. The memory may include an electromagnetic storage medium, such as a magnetic disk. The memory may include a non-transitory computer readable medium. The memory stores any information to be used for operations of the management apparatus 10. For example, the memory may store a system program, an application program, or the like. The memory may be included in the controller 12.

The interface 14 outputs information, data, or the like from the controller 12 to an external apparatus, and inputs information, data, or the like acquired from the external apparatus to the controller 12. The interface 14 may include a communication module that is configured communicably with the external apparatus, such as the vehicle 40 or the terminal apparatus 20, via a network 30. The communication module may be, for example, compliant with a mobile communication standard, such as the 4th Generation (4G) standard or the 5th Generation (5G) standard. The communication module may be compliant with a communication standard, such as a Local Area Network (LAN). The communication module may be compliant with a wired or wireless communication standard. The communication module is not limited to these examples and may be compliant with various communication standards. The interface 14 may be configured to be able to connect to a communication module.

The interface 14 may be configured to include an input device that accepts input of information, data, or the like from a user. The input device may be configured to include, for example, a touch panel, a touch sensor, or a pointing device such as a mouse. The input device may be configured to include a physical key. The input device may be configured to include an audio input device, such as a microphone.

The interface 14 may be configured to include an output device that outputs information, data, or the like to the user. The output device may include, for example, a display device that outputs visual information, such as images, letters, or graphics. The display device may be configured with, for example, a Liquid Crystal Display (LCD), an organic or inorganic Electro-Luminescent (EL) display, a Plasma Display Panel (PDP), or the like. The display device is not limited to the above displays and may be configured to include various other types of displays. The display device may be configured to include a light emitting device, such as a Light Emitting Diode (LED) or a Laser Diode (LD). The display device may be configured to include various other devices. The output device may include, for example, an audio output device, such as a speaker, that outputs audio information e.g. voice. The output device is not limited to these examples and may include various other devices.

The management apparatus 10 may include a single server apparatus, or multiple server apparatuses capable of communicating with each other.

<Vehicle 40>

The vehicle 40 includes a vehicle body and a drive unit. The vehicle 40 is configured to load, into the vehicle body, articles to be delivered. The vehicle 40 may further include a controller that controls the drive unit. The vehicle 40 may be an engine vehicle or an electric vehicle. The engine vehicle may include an Internal Combustion Engine (ICE) vehicle. The electric vehicle may include a Hybrid Electric Vehicle (HEV), a Plug-in Hybrid Electric Vehicle (PHEV), a Fuel Cell Electric Vehicle (FCEV), or a Battery Electric Vehicle (BEV).

The vehicle 40 may further include a positional information detector that acquires positional information on the vehicle 40 itself. The vehicle 40 may output the positional information on the vehicle 40 itself to the management apparatus 10. The positional information detector may be configured to include a receiver compliant with a satellite positioning system. The receiver compliant with the satellite positioning system may include, for example, a Global Positioning System (GPS) receiver or the like.

The number of vehicles 40 managed by the management system 1 may be two or more. The vehicle 40 may be configured to be operated by a driver or may be configured to travel by automated driving. When being operated by the driver, the vehicle 40 may include an in-vehicle apparatus, such as a navigation apparatus, that acquires a stopping location from the management apparatus 10 and notifies the driver of the stopping location. The stopping location may be notified to the driver by the terminal apparatus 20 described below. When traveling by automated driving, the vehicle 40 may travel to the stopping location acquired from the management apparatus 10.

<Terminal Apparatus 20>

The terminal apparatus 20 may be configured to include one or more processors or one or more dedicated circuits. The terminal apparatus 20 may be configured to include a memory. The memory of the terminal apparatus 20 may be configured to be identical or similar to the memory of the management apparatus 10. The terminal apparatus 20 may be configured to include an interface or a communication module. The interface or communication module of the terminal apparatus 20 may be configured to be identical or similar to the interface or communication module of the management apparatus 10, respectively.

The terminal apparatus 20 may be configured to include an input device that accepts input of information, data, or the like from a user. The input device may be configured to include the various devices described as the interface 14. The terminal apparatus 20 may be configured to include an output device that outputs information, data, or the like to the user. The output device may be configured to include the various devices described as the interface 14.

The number of terminal apparatuses 20 included in the management system 1 is not limited to one and may be two or more. The terminal apparatus 20 may be configured as a mobile terminal, such as a smartphone or a tablet, or a Personal Computer (PC), such as a notebook PC or a tablet PC. The terminal apparatus 20 is not limited to the above examples and may be configured to include various devices.

(Operation Example of Management System 1)

In the management system 1 according to the present embodiment, the controller 12 of the management apparatus 10 determines a stopping location for the vehicle 40, based on vehicle classification data on the vehicle 40, delivery environment information, and stopping environment information during delivery.

<Determination of Stopping Location Based on Impact of Stopping Vehicle 40>

The controller 12 may determine the stopping location based on the vehicle classification data, the delivery environment information, and the stopping environment information, taking into account the impact of stopping the vehicle 40.

The vehicle classification data on the vehicle 40 may include, for example, a classification based on the body size of the vehicle 40. The vehicle 40 may be classified according to the body size, for example, as very small, small, medium, large, or very large. The vehicle classification data on the vehicle 40 may include the size of an external shape, weight, or the like of the vehicle 40. The vehicle classification data on the vehicle 40 may include the minimum turning radius of the vehicle 40, the difference between inner or outer wheels thereof, or the like. Of the vehicle classification data on the vehicle 40, data regarding the external shape of the vehicle 40 can relate to the magnitude of an impact on other automobiles, motorcycles, pedestrians, or the like passing in the vicinity when the vehicle 40 is stopped.

The vehicle classification data on the vehicle 40 may include the size, position, or the like of a luggage carrier provided in the vehicle 40. The vehicle classification data on the vehicle 40 may include the capacity of packages loadable into the vehicle 40. Of the vehicle classification data on the vehicle 40, data regarding the luggage carrier of the vehicle 40 can relate to the magnitude of an impact on other automobiles, motorcycles, pedestrians, or the like passing in the vicinity when the vehicle 40 is stopped to handle packages. Of the vehicle classification data on the vehicle 40, data regarding the luggage carrier of the vehicle 40 can relate to the magnitude of the impact of noise occurring when the vehicle 40 is stopped to handle the packages, on surrounding pedestrians, residents, or the like.

The vehicle classification data may include information identifying whether the vehicle 40 is powered by an engine or a motor. The vehicle classification data may include information identifying whether the vehicle 40 is an engine vehicle or an electric vehicle. The vehicle classification data may include information identifying whether the vehicle 40 is a refrigerated vehicle. The vehicle classification data may include information identifying whether the vehicle 40 is equipped with a compressor or the like to control the temperature of a luggage room. Of the vehicle classification data on the vehicle 40, data regarding a power source equipped in the vehicle 40 can relate to the magnitude of the impact of noise occurring when the vehicle 40 is stopped, on surrounding pedestrians, residents, or the like.

The vehicle classification data is information that does not change over time. The controller 12 may store the vehicle classification data on each vehicle 40 in the memory in advance.

The delivery environment information is information on an environment of a delivery destination of a package. The delivery environment information may include information on an environment between a location at which the vehicle 40 is stopped and the delivery destination of the package. The delivery environment information may include a delivery location, a delivery date and time, whether a package drop is acceptable, factors having impacts on time to stop the vehicle 40 during the delivery, or the like. The stopping environment information is information regarding an environment of the location at which the vehicle 40 is stopped for the delivery. The stopping environment information may include the size of space for handling the packages for the delivery, surrounding residents, traffic or noise, weather conditions, or the like. The delivery environment information or the stopping environment information can relate to the type or magnitude of the impact of stopping the vehicle 40 on pedestrians, residents, or the like around the location at which the vehicle 40 is stopped. The delivery environment information or the stopping environment information can relate to sensitivity of the pedestrians, residents, or the like around the location at which the vehicle 40 is stopped, to the impact of stopping the vehicle 40. The type of the impact may include, for example, noise, traffic obstruction, or the like. The sensitivity to the impact of stopping the vehicle 40 corresponds to ease of perception of noise, difficulty in passing, or the like due to the stopping of the vehicle 40. The delivery environment information or the stopping environment information may also include the probability of people, such as surrounding pedestrians or residents, communicating complaints to a delivery worker.

The controller 12 may determine a stopping location so that the vehicle 40 has less impact on the surroundings of the stopping location. For example, the controller 12 may extract one or more locations, as candidates for the stopping location, based on delivery destinations of the packages loaded in the vehicle 40. The locations that are candidates for the stopping location are also referred to as candidate locations. The controller 12 may estimate impacts on the surroundings when the vehicle 40 is stopped, and extract the candidate locations based on the estimated results.

After extracting the candidate locations, the controller 12 may estimate the type or magnitude of an impact on the surroundings when the vehicle 40 is stopped at each candidate location. The magnitude of the impact can be represented, for example, by the volume of noise, the rate of speed reduction of automobiles or other vehicles passing in the vicinity, or the like. The controller 12 may determine the stopping location for the vehicle 40 from among the candidate locations, based on the estimated result of the type or magnitude of the impact of stopping the vehicle 40 at each candidate location.

The controller 12 may estimate time required to deliver the package when the vehicle 40 is stopped at each candidate location. In other words, the controller 12 may estimate time to stop the vehicle 40 at each candidate location. The controller 12 may determine the stopping location for the vehicle 40 from among the candidate locations, based on the estimated result of the time to stop the vehicle 40 at each candidate location.

The controller 12 may determine the stopping location for the vehicle 40 from among the candidate locations, based on both the estimated result of the type or magnitude of the impact of stopping the vehicle 40 at each candidate location and the estimated result of the time to stop the vehicle 40 at each candidate location. The controller 12 may extract candidate locations at which the estimated time to stop the vehicle 40 is less than a predetermined time. The controller 12 may determine the stopping location from among the extracted candidate locations, based on the estimated result of the type or magnitude of the impact. The controller 12 may also extract candidate locations at which the magnitude of the impact of stopping the vehicle 40 is less than a predetermined value. The controller 12 may determine the stopping location from among the extracted candidate locations so that the time to stop the vehicle 40 is minimized or so that the time to stop the vehicle 40 is less than a predetermined time.

The controller 12 may calculate a score representing the impact of stopping the vehicle 40 at each candidate location, based on the estimated result of the time to stop the vehicle 40 during the delivery and/or the estimated result of the type or magnitude of the impact of stopping the vehicle 40. In the present embodiment, the greater the impact of stopping the vehicle 40 at a candidate location on surrounding automobiles or people, the greater the controller 12 calculates the score for the candidate location.

The controller 12 may, for example, calculate the score with a higher value the longer the vehicle 40 is stopped. The controller 12 may, for example, calculate the score with a higher value the larger the external shape of the vehicle 40 or space occupied by handling the packages. The controller 12 may, for example, calculate the score with a higher value the louder the engine or compressor sound produced by the vehicle 40 itself. The controller 12 may, for example, calculate the score with a higher value the louder the sound produced by handling the packages. The controller 12 may calculate, as a value of the score, the product of the length of the time to stop the vehicle 40 and a value representing the magnitude of the impact.

The controller 12 may determine the stopping location for the vehicle 40 based on the calculated score. The controller 12 may determine, as the stopping location, a candidate location at which the calculated score is minimized. The controller 12 may determine the stopping location from among candidate locations for which the calculated scores are less than a predetermined value.

The controller 12 may, conversely, calculate the score with a higher value the less the impact. In this case, the controller 12 may determine, as the stopping location, a candidate location at which the calculated score is maximized. The controller 12 may determine the stopping location from among candidate locations for which the calculated scores are greater than or equal to a predetermined value.

The controller 12 may indicate, to the delivery worker, candidate locations at which the impacts of stopping are low, with the terminal apparatus 20 or the interface 14. The delivery worker may stop the vehicle 40 at a stopping location selected from the indicated candidate locations. The controller 12 may acquire information identifying the result of the selection from the candidate locations by the delivery worker with the terminal apparatus 20 or the interface 14.

As described above, the controller 12 can determine the stopping location for the vehicle 40, taking into account the impact of stopping the vehicle 40. This reduces a mental burden on the delivery worker because the delivery worker is less likely to receive complaints from surrounding people or to be honked at by surrounding automobiles. Also, space for delivery work can be sufficiently secured. In addition, the absence of congestion of people or automobiles in the vicinity makes it easier to move to the next location after a delivery is completed. As a result, the overall efficiency of the delivery work can be increased.

<Operation Directions for Vehicle 40>

The controller 12 may determine an operation schedule for the vehicle 40 based on the determined stopping location. The controller 12 may direct the vehicle 40 to operate on the determined operation schedule.

<Notification of Expected Delivery Time>

As described above, the stopped vehicle 40 or the delivery worker can make an impact on the surroundings. Conversely, the delivery work can be impacted by the surroundings. For example, a delivery time can fluctuate due to an impact from the surroundings. In a case in which the vehicle 40 is to be stopped at the determined stopping location to deliver a package, the controller 12 may generate an expected delivery time based on the stopping location for the vehicle 40. The controller 12 may generate the expected delivery time as an expected delivery time period with a predetermined range.

The controller 12 may notify the generated expected delivery time or expected delivery time period to the terminal apparatus 20 of a user who receives the delivery of the package. The terminal apparatus 20 may allow the user to enter whether the user can receive the package at the notified expected delivery time or expected delivery time period. The terminal apparatus 20 may output, to the management apparatus 10, delivery acceptability information notifying whether the delivery is acceptable at the expected delivery time or expected delivery time period. The controller 12 may acquire the delivery acceptability information from the terminal apparatus 20 and change the stopping location for the vehicle 40 when the delivery is not acceptable.

The controller 12 may generate an expected delivery time or expected delivery time period for each of multiple candidate locations at which the vehicle 40 is to be stopped. The controller 12 may notify the generated expected delivery time or expected delivery time period for each candidate location to the terminal apparatus 20 of a user. The terminal apparatus 20 may allow the user to enter a time or time period at which the user can receive a package, among the notified expected delivery time or expected delivery time period for each candidate location. The terminal apparatus 20 may output, to the management apparatus 10, delivery acceptability information notifying whether a delivery is acceptable at the expected delivery time or expected delivery time period for each candidate location. The controller 12 may acquire the delivery acceptability information from the terminal apparatus 20 and determine, as the stopping location for the vehicle 40, a candidate location to which the delivery is acceptable at the deliverable time or time period. After the stopping location is determined, the controller 12 may generate a more limited expected delivery time or expected delivery time period and notify the terminal apparatus 20 of the user.

As described above, the controller 12 can determine the stopping location by checking whether the user can receive the package at the expected delivery time or the expected delivery time period. This can increase the suitability of the stopping location. In addition, the frequency of re-delivery can be reduced. The convenience of the user can therefore be improved. As a result, the overall efficiency of the delivery work can be increased.

<Example Procedure for Management Method>

The controller 12 of the management apparatus 10 may, for example, perform a management method including the procedure of the flowchart illustrated in FIG. 2 to determine a stopping location for a delivery vehicle and direct operations of the delivery vehicle. The management method may be implemented as a management program to be executed by the controller 12. The management program may be stored on a non-transitory computer readable medium.

The controller 12 acquires information such as delivery environment information, stopping environment information, and vehicle classification data on the vehicle 40 (step S1). Based on the information acquired in step S1, the controller 12 calculates a score representing the impact of stopping the vehicle 40 when the vehicle 40 is stopped at each candidate location (step S2). The controller 12 determines, based on scores calculated in step S2, a stopping location for the vehicle 40 (step S3). The controller 12 determines an operation schedule for the vehicle 40 based on the determined stopping location (step S4).

The controller 12 generates an expected delivery time or expected delivery time period and notifies the terminal apparatus 20 of a user (step S5). The controller 12 acquires delivery acceptability information from the terminal apparatus 20 and determines whether the user has notified that a delivery is acceptable (step S6). When the user has not notified that the delivery is acceptable (step S6: NO), i.e., the controller 12 receives notification from the user that the delivery is not acceptable, the controller 12 changes the stopping location for the vehicle 40 (step S7). After performing the process of step S7, the controller 12 returns to the process of determining an operation schedule in step S4. When the controller 12 receives notification from the user that the delivery is acceptable (step S6: YES), the controller 12 directs the vehicle 40 to operate according to the operation schedule determined in step S4 (step S8). After performing the process of step S8, the controller 12 ends the execution of the procedure in the flowchart of FIG. 2. The procedure of the management method is not limited to the example procedure in the flowchart in FIG. 2 and may include other processes. Some of the processes in the example procedure in FIG. 2 may be omitted or the order may be interchanged.

SUMMARY

As described above, the controller 12 of the management apparatus 10 can determine the stopping location for the vehicle 40 based on the vehicle classification data for the vehicle 40, the delivery environment information, and the stopping environment information. This reduces a mental burden on a delivery worker because the delivery worker is less likely to receive complaints from surrounding people or to be honked at by surrounding automobiles. Also, space for delivery work can be sufficiently secured. In addition, the absence of congestion of people or automobiles in the vicinity makes it easier to move to the next location after a delivery is completed. The controller 12 can determine the stopping location by checking whether a user can receive a package at an expected delivery time or an expected delivery time period. This can increase the suitability of the stopping location. In addition, the frequency of re-delivery can be reduced. The convenience of the user can therefore be improved. As a result, the overall efficiency of the delivery work can be increased.

While an embodiment of the present disclosure has been described with reference to the drawings and examples, it is to be noted that various modifications and revisions may be implemented by those skilled in the art based on the present disclosure. Accordingly, such modifications and revisions are included within the scope of the present disclosure. For example, functions or the like included in each means, each step, or the like can be rearranged without logical inconsistency, and a plurality of means, steps, or the like can be combined into one or divided.

The invention claimed is:

1. A management method of managing a delivery of a package to a delivery destination performed by a management apparatus including a controller and an interface, the management method comprising:
   acquiring, by the controller via the interface, vehicle classification data on a vehicle used for the delivery, delivery environment information, and stopping environment information during the delivery;
   extracting, by the controller, a plurality of candidate locations to stop the vehicle at the delivery destination during the delivery based on the vehicle classification data, the delivery environment information, and the stopping environment information;
   calculating, by the controller, a magnitude of an impact of stopping the vehicle during the delivery at each of the plurality of candidate locations;
   determining, by the controller, one of the plurality of candidate locations as a stopping location for the vehicle at the delivery destination during the delivery based on the magnitude of the impact of stopping the vehicle;
   outputting, by the controller via the interface, the stopping location to the vehicle; and
   causing, by the controller, the vehicle to autonomously travel to the stopping location to reduce the impact of stopping the vehicle at the delivery destination during the delivery, wherein
   the vehicle classification data comprises data indicative of at least one of: an external shape of the vehicle; a luggage carrier provided in the vehicle; or whether the vehicle is an engine vehicle or an electric vehicle,
   the delivery environment information comprises data indicative of an environment of the delivery destination including at least one of: a delivery location; a delivery date and time; whether a package drop is acceptable; or a factor having an impact on time duration to stop the vehicle during the delivery, and
   the stopping environment information comprises data indicative of surroundings of the stopping location including at least one of: a size of space for handling the package; a resident; traffic volume; noise; or weather conditions.

2. The management method according to claim 1, comprising:
   calculating, by the controller, a score representing an impact of stopping the vehicle, based on an estimated result of time to stop the vehicle during the delivery or an estimated result of a magnitude of the impact of stopping the vehicle; and
   determining, by the controller, the stopping location for the vehicle based on the score.

3. The management method according to claim 1, comprising:
   generating, by the controller, based on the stopping location for the vehicle, an expected delivery time period; and
   notifying, by the controller via the interface, the expected delivery time period to a terminal apparatus of a user who receives the delivery.

4. The management method according to claim 2, comprising:
   generating, by the controller, based on the stopping location for the vehicle, an expected delivery time period; and
   notifying, by the controller via the interface, the expected delivery time period to a terminal apparatus of a user who receives the delivery.

5. The management method according to claim 3, comprising:
   acquiring, by the controller via the interface, from the terminal apparatus of the user, delivery acceptability information notifying whether the delivery is acceptable during the expected delivery time period; and
   changing, by the controller, the stopping location for the vehicle based on the delivery acceptability information.

6. The management method according to claim 4, comprising:
   acquiring, by the controller via the interface, from the terminal apparatus of the user, delivery acceptability information notifying whether the delivery is acceptable during the expected delivery time period; and
   changing, by the controller, the stopping location for the vehicle based on the delivery acceptability information.

7. A management apparatus of managing a delivery of a package to a delivery destination comprising a controller and an interface, wherein
   the controller is configured to:
     acquire, via the interface, vehicle classification data on a vehicle used for the delivery, delivery environment information, and stopping environment information during the delivery;
     extract a plurality of candidate locations to stop the vehicle at the delivery destination during the delivery based on the vehicle classification data, the delivery environment information, and the stopping environment information;
     calculate a magnitude of an impact of stopping the vehicle during the delivery at each of the plurality of candidate locations;
     determine one of the plurality of candidate locations as a stopping location for the vehicle at the delivery destination during the delivery based on the magnitude of the impact of stopping the vehicle;
     output, via the interface, the stopping location to the vehicle; and
     cause the vehicle to autonomously travel to the stopping location to reduce the impact of stopping the vehicle at the delivery destination during the delivery,
   the vehicle classification data comprises data indicative of at least one of: an external shape of the vehicle; a luggage carrier provided in the vehicle; or whether the vehicle is an engine vehicle or an electric vehicle,
   the delivery environment information comprises data indicative of an environment of the delivery destination including at least one of: a delivery location; a delivery date and time; whether a package drop is acceptable; or a factor having an impact on time duration to stop the vehicle during the delivery, and
   the stopping environment information comprises data indicative of surroundings of the stopping location including at least one of: a size of space for handling the package; a resident; traffic volume; noise; or weather conditions.

* * * * *